US010829421B2

(12) United States Patent
Larrosa Padro

(10) Patent No.: US 10,829,421 B2
(45) Date of Patent: Nov. 10, 2020

(54) PRODUCTION OF IMPROVED FORTIFIER FROM BEER YEAST WATER

(71) Applicant: Adobs I Innovacio Fitovegetal Hortus Natura S.L., Barcelona (ES)

(72) Inventor: Marta Larrosa Padro, Barcelona (ES)

(73) Assignee: Adobs I Innovacio Fitovegetal Hortus Natura S.L., Barcelona (ES)

( * ) Notice: Subject to any disclaimer, the term of this patent is extended or adjusted under 35 U.S.C. 154(b) by 187 days.

(21) Appl. No.: 15/765,370

(22) PCT Filed: Oct. 14, 2015

(86) PCT No.: PCT/ES2015/070746
§ 371 (c)(1),
(2) Date: Apr. 2, 2018

(87) PCT Pub. No.: WO2017/064337
PCT Pub. Date: Apr. 20, 2017

(65) Prior Publication Data
US 2018/0282238 A1    Oct. 4, 2018

(51) Int. Cl.
| | | |
|---|---|---|
| *C05F 5/00* | (2006.01) | |
| *C12F 3/06* | (2006.01) | |
| *C05F 11/10* | (2006.01) | |
| *A01N 63/30* | (2020.01) | |
| *C05G 5/23* | (2020.01) | |

(52) U.S. Cl.
CPC ............... *C05F 5/00* (2013.01); *A01N 63/30* (2020.01); *C05F 11/10* (2013.01); *C05G 5/23* (2020.02); *C12F 3/06* (2013.01); *Y02A 40/209* (2018.01)

(58) Field of Classification Search
CPC ... C05F 5/00; C05F 11/10; C05G 5/23; A01N 3/30; C12F 3/06; Y02A 40/209
See application file for complete search history.

(56) References Cited

U.S. PATENT DOCUMENTS

| | | | |
|---|---|---|---|
| 6,042,629 A |  | 3/2000 | McGarrity |
| 7,074,251 B1 | * | 7/2006 | Rogers ................... C05F 5/008 71/25 |

FOREIGN PATENT DOCUMENTS

| | | |
|---|---|---|
| CN | 1217307 | 5/1999 |
| CN | 101209944 | 7/2008 |
| ES | 2088826 | 9/1996 |

(Continued)

*Primary Examiner* — Jennifer A Smith
(74) *Attorney, Agent, or Firm* — Defillo & Associates; Evelyn A Defillo

(57) ABSTRACT

A fortifier for growth and flowering in horticulture, trees and ornamental plants, aromatic plants and fruit trees, from wastewater from brewer's yeast with a very low protein concentration. Its attainment is comprised of the previous stages: filtered by 80 μm; magnetic treatment of the liquid; addition of 0.1 to 20 g/l phosphate and 10 to 20 g/l glycose. Fermentation is carried out keeping the free amino acid content greater than 0.1%, the content of $Mg^{+2}$ greater than 0.1%, total nitrogen, phosphate, and potassium below 3.0%, the content of protein from 0.5% to 1.0% and EDTA from 0.02% to 0.2%, all by dry matter weight; addition of microbes from the environment; at temperatures of 15° C. to 40° C. with gentle agitation, for 24 hours to 30 days; subsequent filtering and pH adjustment. It has been found to be effective in various crops.

8 Claims, 4 Drawing Sheets

(56) References Cited

FOREIGN PATENT DOCUMENTS

| | | |
|---|---|---|
| ES | 2329750 | 11/2009 |
| ES | 2397178 | 3/2013 |
| JP | 2007326740 | 3/2016 |
| WO | WO0107380 | 2/2001 |

\* cited by examiner

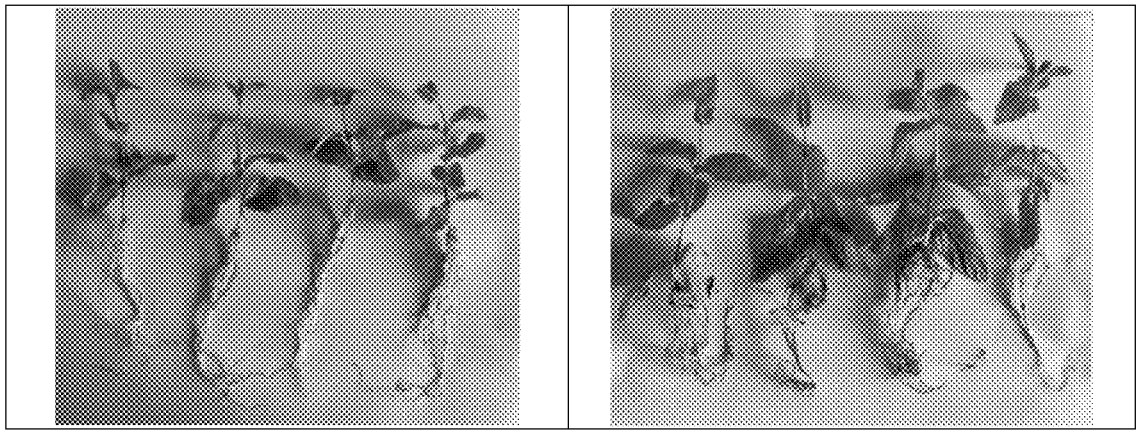
Figure 1a                    Figure 1b
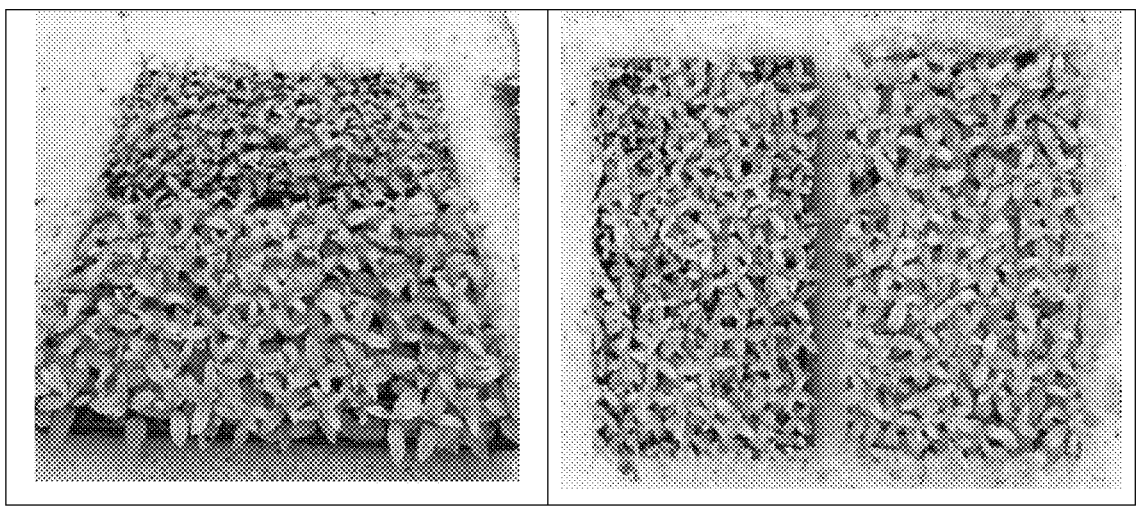
Figure 2a                    Figure 2b

PRODUCTION OF IMPROVED FORTIFIER FROM BEER YEAST WATER

CROSS REFERENCE TO RELATED APPLICATION

This application is a national stage entry of PCT/ES2015/070746 filed Oct. 14, 2015, under the International Convention.

DESCRIPTION

Field of the Invention

The present invention concerns the area of fertilizers and fortifiers intended for varios crops and plants. More precisely the obtaining of fortifying fertilizers from brewer's yeast water with a very low protein concentration.

In particular, it also refers to the area of environmental protection by reducing the release of products harmful to the environment, such as said brewer's yeast water, which may trigger uncontrolled fermentation in the environment.

Prior Art

Some references that to a certain extent concern the topic of interest are known. The document CN101209944 prepares a fortifier and fertilizer by fermentation wherein it uses, among others, a waste sludge from beer production, as well as waste from plant sources and other organic waste. It holds no interest except for the use of brewer's yeast in the fermentation of plant waste.

The use of wastewater from beer production in the preparation of plant foliage fertilizers is known from the document CN1217307. Water is acidified at low pH 1,5-2,5, $KNO_3$, $NH_4NO_3$, $KH_2PO_4$, $MgSO_4$, $H_3BO_3$, $Na_2$-EDTA, $ZnSO_4$, $CuSO_4$, $MnSO_4$, Kl, $CoCl_2$ are added and they can prepare it before or after beer fermentation. Rather it is used as a simple mixture to which the known elements K, N, P and trace elements are added, wherein, when used, the discharged amount of this waste contaminant decreases and it is successfully used as a fertilizer with a broad spectrum of application.

The patent U.S. Pat. No. 6,042,629 discloses a method using residual brewery cleaning solutions. First, it uses potassium alkaline solutions, and subsequently nitrogen and/or phosphorus acid solutions. These solutions produce a fertilizer solution containing potassium salts, nitrogen, organic materials, and materials derived from fermentation. The document P2329750 discloses a method for obtaining a fertilizing product from waste from the brewing of beer, characterized in that it comprises the steps of:

subjecting the waste to alkaline treatment at a pH of 10.5-13 followed by filtration to obtain a protein solution;

subjecting the protein solution obtained in step (a) to acid treatment at a pH of 2.5-4.5 followed by filtration to obtain a protein concentrate; and subjecting the protein concentrate obtained in step (b) to hydrolysis to obtain a fertilizer product.

A prior application of the applicant ES2088826 describes a process for obtaining putrescine and cadaverine diamines by fermentation from treated waste or byproducts of difficult ecological elimination, and their subsequent use as an additive in fertilizers, and the corresponding fertilizer. However, this application was aimed at the use of waste from the pharmaceutical industry or biotechnology industry. It is known that such protein-rich waste from microbial cultures and cell cultures without expensive treatments can be harmful to the environment.

However, work that undertakes an economically viable use of diluted waste from the beer production process is lacking. A suitable method for the use of integrated waste with a very low protein concentration is the fermentation thereof. The present application is aimed at the fermentation of beer waters and their conversion into useful products such as fortifiers and fertilizers for crops and plants. The solution seems to be the fermentation of these waters and their conversion into useful products such as fortifiers and fertilizers for various crops and plants. Although there are some references to the use of waste yeast, i.e., sludge, coming from the fermentation of beers and other products, they are, however, focused on the fermentation of natural products with high protein content. On the other hand, there are no works dedicated to the direct fermentation of these waste waters from the production of beers that have very low protein concentrations.

In fact, neither are there references to obtaining triamine spermidine and tetramine spermine that, if present, could provide a significant enhancement of the fortifying and fertilizing properties of the fermentation products, enhancement due to an eventual synergism because of the joint presence of the different polyamines.

OBJECTIVE OF THE INVENTION

A first objective of the invention is to obtain an improved fortifier from the direct fermentation of wastewater from the production of beers with a very low protein concentration. This improved fortifier is a biological product that can be used in agricultural treatments to improve growth, flowering and crop yields both in application in floriculture and in horticulture, aromatic plants, ornamental plants and trees, and fruit trees.

A second objective of the invention is to obtain an improved fortifier composed of triamine spermidine and tetramine spermine thanks to which the fortifying action may be substantially higher due to the synergism of the joint presence of said polyamines.

A third objective of the invention is to obtain an improved fortifier that does not represent any danger to the environment. A fortifier that neither saturates nor overloads the subsoil and is compatible with products of an organic nature. This would entail the additional benefit of reducing the impact on the environment of wastewater from beer production, which are transformed into a beneficial product instead of being released directly into the environment.

SUMMARY OF THE INVENTION

An improved fortifier is obtained from wastewater with low protein content from brewer's yeast. A valuable product is obtained for use in various crops such as ornamental plants, aromatic plants, vegetable crops, lawns and trees. Thus, the negative environmental impact of wastewater is reduced such as that of the beer industry.

The process results in a product with a significant content of polyamines, in particular putrescine diamines and cadaverine, triamine spermine and tetramine spermidine. In order to obtain the polyamines, these amino acids are essential: Arginine (ARG), Lysine (LYS), Ornithine (ORN) and Methionine (MET).

The transformation reactions of the aforementioned amino acids to polyamines, is performed by a single incubation with natural microbes present in the environment, such as *Enterobacter aerogenes, Enterobacter gergoviae, Hafnia alvei, Serratia marcescens, Kluyvera ascorbata* and *Obesumbacterium proteus*. From trials of different reaction methods, it was then determined that after the start of an incubation and once the polyamines putrescine and cadaverine are obtained, it is imperative to add the amino acid methionine (MET) and the cation magnesium (Mg++) to the mixture obtained.

It has been discovered that the presence of these two diamines putrescine and cadaverine activates the synthesis of new polyamines such as spermine and spermidine that are polyamines regulating growth, flowering and cell elongation in the plant kingdom. The synergistic effect of the joint action of putrescine and cadaverine, mentioned in the previous patent from the applicant Agusti Salavert, application ES2088826 of 1995, is significantly enhanced after the addition of methionine and magnesium (Mg++) due to the presence of spermine and spermidine. The present invention allows a product with excellent properties to be obtained where the joint synergistic action of the four polyamines takes place.

The low concentration of NPK, at values lower than 3% in total, the organic origin of the product and the natural process of later fermentation, opens up its application to ecological crops. The presence of a certain concentration of proteins is necessary to maintain the stability of the aforementioned polyamines in solution although it is significantly low. This effect is favored by the formation of protein complexes and chelators with Ethylenediamine (EDTA) present.

The Improved Fortifier is obtained through a single incubation in brewer's water. The by-product obtained from beer fermentation and an amino acid product is used as raw material. The aqueous solution of yeast, malt, amino acids and waste organic extracts obtained during the manufacturing process thereof are mixed.

The procurement includes of the following steps:

Product Reception:

The product coming from beer fermentation is received, dosed directly in 1,000 liter barrels. Once the barrels are received, they are left at rest, at room temperature, for a minimum of 48-72 hours in order to favor the sedimentation of the non-soluble compounds that arrive from the source.

Filtering:

Subsequently, filtration is carried out to eliminate most of the precipitate in suspension. For this purpose, a filtration device with a pore size filter of 80 µm is used.

Magnetic Treatment of the Liquid:

The previously obtained filtrate is subjected to magnetic treatment in a kit equipped with quartz crystals inlaid with gold. This treatment acts on the liquid, homogenizing the solution and favoring fermentation.

Preparation of Fermentation:

Control and initial pH adjustment at 5.9 to 9.0 with 0.1 to 20 g/l phosphate buffer is performed. 10-20 g/l glucose is added and subsequently a microbe suspension is added.

Addition of Amino Acids:

An amino acid solution is added to the liquid in order to regulate the concentration of the mixture's free amino acids. These amino acids should include Lysine, Methionine, Ornithine, Arginine, Glutamine, Homoarginine and Citrulline in their composition, each in concentrations above 0.1%.

Other Factors:

A protein concentration of between 0.5% and 1.0% and between 0.02% and 0.2% of EDTA must be maintained, both expressed as dry matter.

Fermentation:

Once the mixture is homogenized, the 1000 liter barrels are placed in the room at a controlled temperature of between 15 and 40° C. The mixture remains in these conditions for between 2 and 60 days. During this period an accelerated natural fermentation process of the beer-derived waste components takes place.

Control of Fermentation and pH Control:

The monitoring of the process is carried out by the progressive reduction of the pH. The end of the fermentation period is set in the range of pH 5.0-6.0. This ensures the correct maturation state of the yeast and the presence of the amino acids.

Final Filtering:

At the end of the fermentation process, new filtering is carried out with another filter with a pore size of 80 µm to eliminate the impurities resulting from fermentation and stabilize the final product.

Dosage and Bottling:

Lastly it is dosed, labeled and packaged for sale.

In summary, the procedure consists of the following operations:

Filtering with an 80 µm filter.

Magnetic treatment of the liquid

Additions to the liquid for fermentation:

0.1-20 g/l phosphate for an initial pH adjustment of between 6.5-8.0;

addition of 10-20 g/l glucose, and microbe suspension.

Ensuring that in the medium there is a content higher than 0.1% (in dry matter) of each of the key free amino acids in the incubation process, Ornithine, Methionine, Arginine, Lysine, Glutamine, Homoarginine and Citrulline, in addition to the presence of magnesium as $Mg^{+2}$ cation.

Ensuring very low concentrations of nitrogen, phosphate and potassium that together should not exceed 3% in total of the mixture.

Protein concentration should range from 0.5% to 1.0% in dry matter to facilitate the formation of protein complexes and chelators.

Undertaking a single fermentation with glucose as sole environmental substrate, and keeping the temperature in the range of 15-40° C., effecting a continuous smooth movement of the suspension.

Prolonging incubation preferably from 24 hours to 30 days according to the degree of concentration of the desired final components.

Subjecting the slurry to a second filtration by 80 µm.

Performing a second pH control adjusting it between 5.0-6.0.

BRIEF DESCRIPTION OF THE FIGURES

FIGS. 1*a* and 1*b* display examples of conventional production cuttings with addition of the fortifier respectively, grown in parallel for 5 weeks.

FIG. 2*a* displays the treated cuttings with addition of the fortifier that are on the front tray and in FIG. 2*b* are on the right tray.

EMBODIMENTS OF THE INVENTION

Obtaining the Fortifier 900 liters of liquid are placed in a container with a capacity of 1000 liters. It is left to settle for 48 hours. The liquid is filtered through a filter with a pore size of 80 µm and passed through a magnetic treatment kit. 50 liters of 10% concentrated amino acids are added for a total concentration of 1% amino acids in the solution. 25 liters of glucose solution of a 0.4 kg/I concentration and 25 liters of a slurry of $10^8$ microbes/ml are added. It is fermented in a room at a controlled temperature of 30° C. for 45 days. At the end of fermentation pH control is performed and it is again passed through a filter with a pore size of 80 µm. The product is defined as finished to be bottled.

The following studies were undertaken with the final product resulting from this same fermentation, with the results below.

Aromatic Plant—Mint

Study carried out in an ecological nursery of aromatic plants with the purpose of determining the final result in the mint cuttings after the application of the fortifier directly to the mother plants.

Comparison of the growth of cuttings from plants treated with the addition of fortifier and plants that have not been. 20 mother plants of this variety were selected, they were watered and conventional fertilizer solution plus fortifier solution were applied. After 1 month the cuttings protruding therefrom began to be monitored and were compared with the nursery's conventional mint production.

The cuttings from the plants treated with the addition of fortifier displayed the following characteristics:

Larger size of the cuttings and faster growth (5 days of nursery were gained).

Greater quantity and size of the roots.

More intense color

Higher survival rate of the cuttings.

Increase of more than 30% of the plant's biological mass.

In FIG. 1a (conventional production) and FIG. 1b (with addition of fortifier) the example of the different cuttings obtained grown in parallel for 5 weeks is displayed. It can be seen that the cuttings from plants treated with the addition of the fortifier, had a larger size, a greater volume and size of the roots.

In FIG. 2 the appearance of the cuttings treated with addition of fortifier is compared. In FIG. 2a in the front tray and FIG. 2b the right tray (those treated with fortifier) they are compared with the respective example of the untreated cuttings. The cuttings treated with the addition of the fortifier displayed greater vigor and the production and sale of the cuttings was almost a week ahead. In the cuttings treated with the addition of the fortifier there were no losses, while the conventional production of the nursery had losses of between 3 and 10% according to the case, thus with those that had been treated production without losses was achieved. Growth is standardized. It can be concluded that greater volume and size of the cuttings were obtained when treated with the addition of the fortifier.

Figures 3A, 3B:
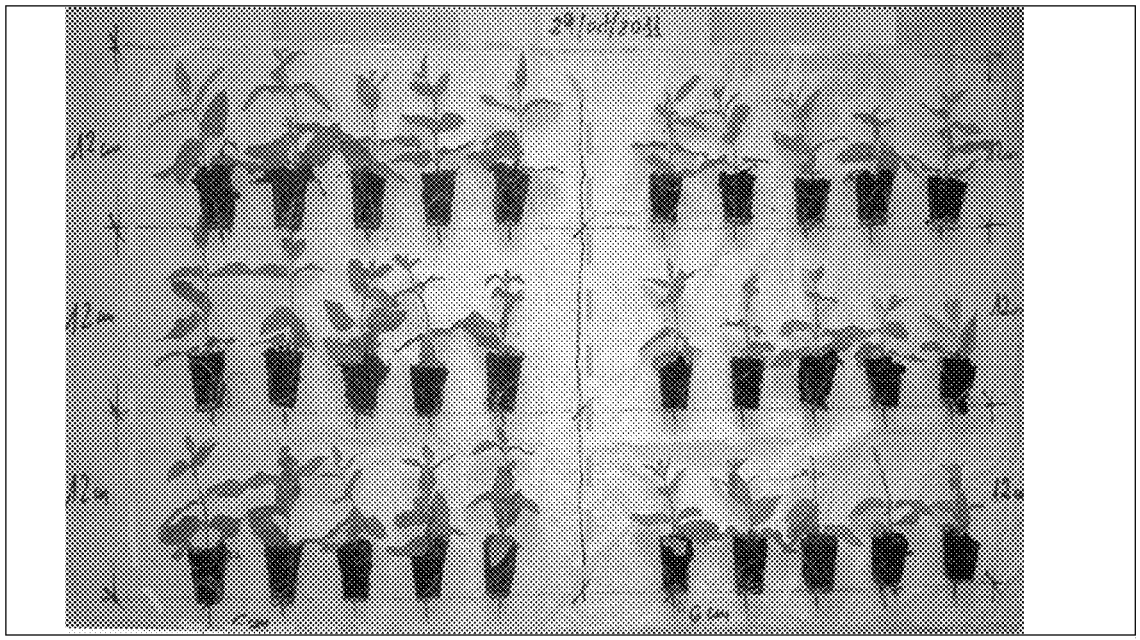
FIG. 3*a* displays the cuttings groups treated with addition of fortifier, and FIG. 3*b* displays those that are untreated.

In FIG. 3 are displayed sizes obtained in centimeters achieved in samples treated with the addition of fortifier FIG. 3a, and without addition FIG. 3b. The groups of cuttings on the left are those treated with the addition of the fortifier. As you can see its height and vigor are greater. With the same growth time, the treated cuttings exceeded the average height of the untreated cuttings by 2 and 3 cm. The difference in size achieved thanks to the use of the fortifier is very evident.

After conducting the culture, a number of cuttings were collected as a representative sample and the biological mass of the mother plants with addition of fortifier and those without was determined. The results obtained are presented in the table below.

Increase in biological mass

|  |  | Increase, % |
|---|---|---|
| Average weight of fresh plants, g |  |  |
| Conventional mother plant cuttings | 9.10 |  |
| Mother plant cuttings with fortifier | 14.20 | 36.0 |
| Average weight of dry plants, g |  |  |
| Conventional mother plant cuttings | 1.40 |  |
| Mother plant cuttings with fortifier | 2.20 | 36.0 |

Test on Beans of the Santa Pau Variety

The results presented have been in experimentation and testing of the fortifier in bean plants of the Santa Pau variety. The study was conducted with a sample of 143 plants. All the plants were fertilized in the same manner, in this case with a conventional granulated fertilizer that was mixed with the soil. From here, part of the plants were also watered with the fortifying product, leaving the other part as a control treated only with the conventional fertilizer.

Tests were carried out with the addition of the fortifier in different concentrations. The recommended concentration according to the protocols of the product was termed 1.0, corresponding to a concentration of 1.0 ppm Polyamine and from this the following lower and upper values were defined: 0.25-0.5-1.5-2.0. The number and weight of the filled pods per plant were counted, and also the number and weight of the beans extracted from the pods per plant.

The following results were obtained:

Table 1 shows the weight of the beans per plant where an optimal increase of 40-44% is obtained compared to the control for a dose value of 1.0.

TABLE 1

Weight of beans per plant

| Dose | Weight (grams) | Increase with regard to control |
|---|---|---|
| Control | 8.3 |  |
| Treatment dose 0.25 | 8.9 | 7% |
| Treatment dose 0.5 | 10.8 | 30% |
| Treatment dose 1.0 | 11.9 | 44% |
| Treatment dose 2.0 | 11.6 | 40% |

Table 2 shows the average number of beans per plant, where an optimum increase of 33% is obtained compared to the control for a dose value of 1.0.

TABLE 2

Average number of beans per plant

| Dose | No. of beans | Increase with regard to control |
|---|---|---|
| Control | 34 | |
| Treatment dose 0.25 | 36 | 5% |
| Treatment dose 0.5 | 41 | 21% |
| Treatment dose 1.0 | 45 | 33% |
| Treatment dose 1.5 | 41 | 20% |
| Treatment dose 2.0 | 41 | 22% |

Table 3 shows the average weight of the pods per plant where an optimal increase of 44% is obtained compared to the control for a dose value of 1.0.

TABLE 3

Average weight of pods per plant

| Weight (grams) | Weight (grams) | Increase with regard to control |
|---|---|---|
| Control | 10.7 | |
| Treatment dose 0.25 | 11.5 | 8% |
| Treatment dose 0.5 | 13.4 | 25% |
| Treatment dose 1.0 | 15.4 | 44% |
| Treatment dose 1.5 | 13.8 | 29% |
| Treatment dose 2 | 14.2 | 32% |

Table 4 shows the average number of pods per plant, where an optimum increase of 24% with respect to the control is obtained for a dose value of 1.0.

TABLE 4

Average number of pods per plant

| Dose | No. pods | Increase in control |
|---|---|---|
| Control | 11 | |
| Treatment dose 0.25 | 12 | 9% |
| Treatment dose 0.5 | 13 | 12% |
| Treatment dose 1.0 | 14 | 24% |
| Treatment dose 1.5 | 13 | 16% |
| Treatment dose 2 | 14 | 22% |

Table 5 presents the average weight of each pod, where an optimum increase of 17% is obtained with respect to the control for a dose value of 1.0.

TABLE 5

Average weight of each pod

| Dose | Weight (grams) | Increase in control |
|---|---|---|
| Control | 1.01 | |
| Treatment dose 0.25 | 0.99 | −2% |
| Treatment dose 0.5 | 1.07 | 12% |
| Treatment dose 1 | 1.18 | 17% |
| Treatment dose 1.5 | 1.09 | 8% |
| Treatment dose 2 | 1.07 | 6% |

When applying different concentrations of the fortifier, in general there was a significant increase both in the number and weight of the pods per plant, as well as in the number and weight of the beans per plant.

Ornamental Plant

The objective of the test was to observe the differences in growth and flowering of the conventional production of the nursery with the same conventional production plus addition of a fortifier solution. The study was carried out in an ornamental plant nursery. Currently it is one of the largest producers of ornamental plants in Maresme. 2 varieties of cuttings and 5 varieties of plants were treated.

Figure 4:
FIG. 4 displays the geranium cuttings treated with the addition of fortifier.

Cuttings:

Cuttings from Ville de Paris Geraniums and Carnations were treated. In both cases 600 units of each. They were watered 3 times with addition of the fortifier, 1 weekly watering for 3 weeks to solution 1/200 vol/vol. In FIG. 4 two photos of the treated cuttings with addition of the fortifier are shown. In both varieties the result was the same, the growth of the cuttings was advanced. They left the nursery a week earlier compared to the conventional one.

Plants:

A total of 380 plants of different varieties were treated with the addition of fortifier, having 5 weeks of life and 6 applications were made. The following varieties were tested:

Ville de Paris Geranium: 80 units.

Double flower geranium: 25 units.

Carnations: 70 units.

Dimorphotheca: 145 units.

Whorled plectranthus: 30 units.

Zone: 30 units.

The applications were made at dilution 1/200 in the following order:

| 1st month | | | | | | | |
|---|---|---|---|---|---|---|---|
| | M | T | W | T | F | S | S |
| Week 1 | 1 | | | | | | |
| Week 2 | 2 | | | | | | |
| Week 3 | | | | | | | |
| Week 4 | | | | | | | |

| 2nd month | | | | | | | |
|---|---|---|---|---|---|---|---|
| | M | T | W | T | F | S | S |
| Week 1 | 3 | | | | | | |
| Week 2 | 4 | | | | | | |
| Week 3 | | | | | | | |
| Week 4 | | | | | | | |

| 3rd month | | | | | | | |
|---|---|---|---|---|---|---|---|
| | M | T | W | T | F | S | S |
| Week 1 | 5 | | | | | | |
| Week 2 | 6 | | | | | | |
| Week 3 | | | | | | | |
| Week 4 | | | | | | | |

During the test, growth and flowering were evaluated. Between the third and the fourth application the change was already evident. In general, all except the whorled plectranthus displayed greater vigor. These manifested increased vigor and flowering, generally an increase in size of between 10 and 20% depending on the case. They also had more roots and a greater number of flowers. On the other hand, the whorled plectranthus manifested an increase in the number of branches.

Geranium Test.

FIG. 4 shows the geranium cuttings treated with addition of the fortifier, those that overtook conventional nursery production between 5 and 7 days. Its growth was greater and faster.

Dimorphotheca Test.

Figure 5:
FIG. 5 displays the differences in root growth when applying fortifier in growing Dimorphotheca plants.
Figure 6:
FIG. 6 displays the general appearance of Dimorphotheca plants treated before flowering.

FIG. 5 shows the results obtained in the treated plants with addition of fortifier, which showed a higher quantity of roots. The plant on the right is the plant treated with the fortifier and as you can see the roots are more numerous and go up higher into the pot. FIG. 6 shows that the treated plants have greater vigor and a greater number of leaves per shoot and buds about to flower.

Figure 7:
FIG. 7 displays the fortifying action in growing Dimorphotheca plants.
Figure 8:
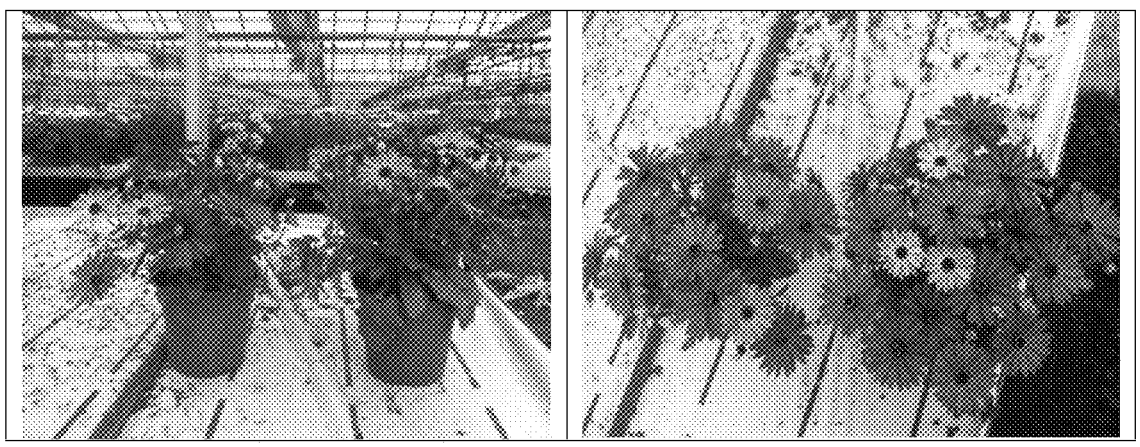
FIG. 8 displays the differences in vigor and flowering of treated Dimorphotheca plants.

FIG. 7 shows the action of the fortifier in growing Dimorphotheca plants. On the left in both photos the pot corresponding to the treated plants with addition of fortifier is shown. The application of the product resulted in a larger size of these of between 10 and 20%, with a higher growth rate and vigor. In FIG. 8 on the right in both photos the pot corresponding to plants treated with addition of fortifier is shown. The plants of treated Dimorphothecas display greater vigor and better flowering. Between 10 and 30% more flowers depending on the sample analyzed.

SUMMARY

Thus, in the present invention, direct fermentation of wastewater with very low protein concentrations coming from the beer production has been achieved. The use of this waste, by eliminating its release into the environment, leads to the corresponding reduction in environmental impact.

It is noteworthy that the objectives of procuremente within the fortifier composition of triamine spermidine and tetramine spermine have also been achieved; thus obtaining an improved fortifier, and evidence of effective action in various crops.

The invention having been sufficiently described, as well as a preferred embodiment thereof, as an example and without limitation, it should be added that it is possible to make changes in its constitution and materials employed without departing from the scope thereof, defined in the following claims.

The invention claimed is:

1. A method for obtaining an improved fortifier from wastewater yeast with low protein concentration comprising:
    obtaining a sample of wastewater from a brewer's water;
    filtering the wastewater through an 80 µm pore filter;
    treating magnetically a liquid portion from the filtering step;
    adding a pH buffer containing between 0.1 and 20 g/l phosphate to a pH of between 5.0-9.0 to form a slurry;
    adding between 10 and 20 g/l of glucose to the slurry;
    adding to the slurry amino acids and a magnesium salt maintaining a content greater than 0.1% dry weight of free amino acids during incubation and at least 0.1% dry weight content of magnesium cation ($Mg+^2$);
    keeping in the slurry concentrations of nitrogen, phosphate, and potassium to less than 3% as a whole;
    keeping in the slurry a concentration of protein of between 0.5% and 1.0% dry weight, and of EDTA of between 0.02% and 0.2% dry weight;
    adding to the slurry microbes from an environment;
    fermenting the slurry at temperatures of between 15° C. and 40° C., making a smooth, continuous motion of the slurry to form a fermenting product;
    incubating the fermenting product for 24 hours to 30 days to obtain an incubating product, the incubation step depends on the desired degree of concentration of the final components;
    filtering the incubating product through an 80 µm pore filter; and
    adjusting the pH between 5.0 and 6.0.

2. The method according to claim 1, wherein the step of treating magnetically is performed in a device equipped with quartz crystals with gold inlays at a temperature between 15° and 40° C. and a passage flow of the liquid between 10 and 100 l/min.

3. The method according to claim 1, wherein the amino acids are selected from the group consisting of Ornithine, Methionine, Arginine, Lysine, Glutamine, Homoarginine, and Citrulline.

4. The method according to claim 1, wherein the microbes from the environment includes *Enterobacter aerogenes, Enterobacter gergoviae, Hafnia alvei, Serratia marcescens, Kluyvera ascorbata,* or *Obesumbacterium proteus.*

5. The method according to claim 1, wherein before fermentation, protein concentration is between 0.1% and 1.0% dry weight.

6. The method according to claim 1, wherein after the fermentation step, diamines putrescine and cadaverine are obtained, and wherein triamine spermidine and tetramine spermine are obtained by adding to the fermented product the amino acid methionine.

7. An improved fortifier obtained according to the following steps:
    a) filtering through an 80 µm pore filter a sample of wastewater from a brewer's water;
    b) treating magnetically a liquid portion of the filtering step;
    c) adding a pH buffer containing between 0.1 and 20 g/l phosphate to a pH of between 5.0-9.0 to form a slurry;
    d) adding between 10 and 20 g/l glucose to the slurry;
    e) adding to the slurry amino acids and magnesium salt to maintain during incubation a content greater than 0.1% dry weight of free amino acids and at least 0.1% dry weight of a magnesium cation content ($Mg+^2$);
    f) keeping in the slurry concentrations of nitrogen, phosphate, and potassium, which together should not exceed 3.0% dry weight of the slurry;
    g) keeping in the slurry a protein concentration of 0.5% to 1.0% dry weight, and EDTA concentration of 0.02% to 0.2% dry weight;
    h) adding to the slurry microbes from an environment;
    i) fermenting the slurry at temperatures between 15° C. and 40° C., making a smooth and continuous movement of the slurry to form a fermenting product;
    j) incubating the fermented product for 24 hours to 30 days to obtain an incubating product, the incubating step depends on the desired degree of concentration of the final components;
    k) filtering the incubated product through an 80 µm pore filter; and
    l) adjusting the pH from 5.0 to 6.0.

8. The improved fortifier according to claim 7, further comprising the step of applying the fortifier to roots, stems, flowers, and cellular elongation in horticulture, aromatic plants, trees, ornamental plants, or fruit trees.

* * * * *